UNITED STATES PATENT OFFICE.

MILTON FLETCHER LINDSLEY, OF KINGS MILLS, OHIO, ASSIGNOR TO THE KING POWDER COMPANY, OF CINCINNATI, OHIO, A CORPORATION OF OHIO.

EXPLOSIVE.

1,008,725.  Specification of Letters Patent.  Patented Nov. 14, 1911.

No Drawing.  Application filed June 8, 1907.  Serial No. 377,861.

*To all whom it may concern:*

Be it known that I, MILTON F. LINDSLEY, a citizen of the United States, residing at Kings Mills, in the county of Warren and State of Ohio, have invented a certain new and useful Improvement in Explosives, of which the following is a full, clear, and exact specification.

The invention relates to explosives and more particularly to what is known as "smokeless" powder, designed for use in fire arms, and is what may be called a "semi-dense" powder, found to be very desirable if not the most desirable in practice. In such a powder it is very necessary that it shall be safe and reliable in making and in firing, that it shall be stable, that is, not easily affected by climatic changes or age, that it shall give a high velocity to the projectile with moderate pressure, and that it shall be free from smoke, injurious gases and residuum in firing.

It is the primary object of the invention to secure an improved explosive combining all of these elements of advantage and possessing other new and useful characteristics as hereinafter set forth, utilizing at the same time materials and processes in the production of the same that shall keep the product within reasonable cost.

The preferred ingredients employed in the manufacture of my improved powder are cellulose and starch, which are granulated and treated with nitro-benzin in the form of what is commonly called mirbane oil, although in some cases nitro-toluene or glycerin may be employed instead of mirbane oil, mirbane oil being preferred. Mixed acid is then added to the product consisting preferably of about one part of nitric acid and two parts of sulfuric acid, the nitric acid to have a specific gravity of about 1.500 and the sulfuric acid of about 1.840. After nitration the resulting material is treated with nitro-benzin, preferably in the form of mirbane oil, and in some cases it is found desirable to treat the nitrated product with a solid inorganic nitrate before the last application of the mirbane oil, as hereinafter more fully set forth.

In the preferred form of practicing the invention the cellulose, which may be any suitable fiber, such as cotton or fiber of corn stalk, is first mechanically reduced to a fine impalpable powder. However, the preferred form of cellulose is a chemically pure wood pulp, as in this form it is found more friable and tractable for this purpose. To about 90% weight of the cellulose powder thus prepared, 10% weight of starch is added, which is preferably potato or rice starch. This starch is mixed with cold water, then boiled and mixed with the cellulose forming a stiff dough or plastic mass. This dough is then separated into a quantity of longitudinal lengths of small diameter preferably accomplished by forcing the dough by a piston or screw through a plate or die containing a number of small holes. The yarn or strings of the dough or plastic mass thus formed are next thoroughly dried, then are broken up in a corning mill or other suitable device, after which it is sifted and formed into grains of proper size intended for the finished product. The material in this granular form is then treated by saturating it with about 20% of its weight of nitro-benzin (mirbane oil), or nitro-toluene or glycerin, although nitrobenzene is preferred, according to the purpose for which the powder is intended, the general object being to give higher power as an explosive. After being thus formed and saturated, the material is next treated with a bath of mixed acid as already described, consisting of about one part of nitric acid and about two parts of sulfuric acid. The material is next washed and thoroughly neutralized, after which it is dried at a temperature of 140° to 150° Fahr. until absolutely free of moisture. If found desirable it may next be treated to a solution of about 10% of nitrate of potassium, or of nitrate of barium, or of nitrate of ammonia, although this treatment is not generally found necessary. When by experience this latter treatment is found desirable, the material should again be thoroughly dried. But whether thus treated or not, the material, which will still be in granular form, should again and finally be treated by placing it in a glaze tub in which it is rubbed and glazed after applying to it from 3% to 5% of nitro-benzin with a little plumbago added. This latter treatment serves as a further protection against moisture and facilitates the flow of the powder in loading. After this finishing process the powder is again returned to the drying house, where it remains for two or three days under a temperature of 120° Fahr. Then it will be found advisable to keep it stored in bulk for several weeks longer before packing or firing in order that it may be thoroughly seasoned and protected against atmospheric changes. The different batches of powder, thus dried and seasoned, are preferably blended.

For nitrating, any ordinary apparatus used for such purposes may be used and about six pounds of mixed acid as described should be used to one pound of grain. It will thus be seen that the powder is completed up to the point of granulation before being nitrated. This contributes an element of safety in the manufacture and at the same time hardens the surface of the grain, which prevents the grain from rubbing into dust and also protects it against the atmosphere. The combination of the nitro-benzene or mirbane oil with the nitro-cellulose also results in hardening of the grain, and the mirbane oil not only increases the adhesive properties of the granular particles and gives binding effect, but also being in itself a nitro compound it contributes explosive force and so aids in bringing the powder up to "high power." The treatment by solution of nitrate of potassium, nitrate of barium or nitrate of ammonia will also have modifying effects, as is well known, in the rate of combustion and pressure, and this treatment can be utilized in tempering the powder and in reducing it to a given standard when found desirable.

I claim—

1. The herein described method which consists in treating a mechanical mixture of starch and cellulose in granular form with about 20% of its weight of mirbane oil, applying a bath of mixed acid consisting of about one part nitric acid and two parts sulfuric acid, neutralizing and drying the resulting material and applying a waterproofing coating of mirbane oil.

2. The herein described method of producing a nitro-powder, which consists in treating a mechanical mixture of cellulose and starch in granular form with mirbane oil, applying to the resulting material a nitrating bath, after which the granules are neutralized and dried, treated with a solution of a solid inorganic nitrate, and finally treated in finishing and glazing with a coating of mirbane oil.

3. The herein described method of producing a nitro-powder which consists in treating a mechanical mixture of starch and cellulose with mirbane oil, then treating the mixture with a nitrating acid bath, after which the resulting material is washed and neutralized and finally treated with a waterproofing coating of mirbane oil.

In testimony whereof I have signed my name to this specification, in the presence of two subscribing witnesses, on this 5th day of June A. D. 1907.

MILTON FLETCHER LINDSLEY.

Witnesses:
G. M. Peters,
George D. Harper.